No. 845,346.  
PATENTED FEB. 26, 1907.  
J. C. GENTRY & J. T. BOTTOMLEE.  
CHURN.  
APPLICATION FILED JUNE 8, 1906.

2 SHEETS—SHEET 1.

Witnesses  
G. R. Thomas

Inventors  
J. C. Gentry  
J. T. Bottomlee  
By  
Attorneys

No. 845,346. PATENTED FEB. 26, 1907.
J. C. GENTRY & J. T. BOTTOMLEE.
CHURN.
APPLICATION FILED JUNE 8, 1906.

2 SHEETS—SHEET 2.

Witnesses
G. R. Thomas
F. B. MacNab

Inventors
J. C. Gentry
J. T. Bottomlee
By
Attorneys

UNITED STATES PATENT OFFICE.

JAMES C. GENTRY AND JOHN T. BOTTOMLEE, OF DAYTON, TENNESSEE.

CHURN.

No. 845,346.

Specification of Letters Patent.

Patented Feb. 26, 1907.

Application filed June 8, 1906. Serial No. 320,845.

*To all whom it may concern:*

Be it known that we, JAMES C. GENTRY and JOHN T. BOTTOMLEE, citizens of the United States, residing at Dayton, in the county of Rhea, State of Tennessee, have invented certain new and useful Improvements in Churns; and we do hereby declare the following to be a full, clear, and exact description of the invention, such as will enable others skilled in the art to which it appertains to make and use the same.

This invention relates to churns, and has for its object to provide a churn of the vertical reciprocatory dasher-shaft type in which the churn and its shaft may be quickly and readily disconnected from the operating means for the shaft.

A further object of the invention is to provide a novel means for adjusting the length of stroke of the said dasher-shaft to suit the quantity of milk being churned.

Figure 1:
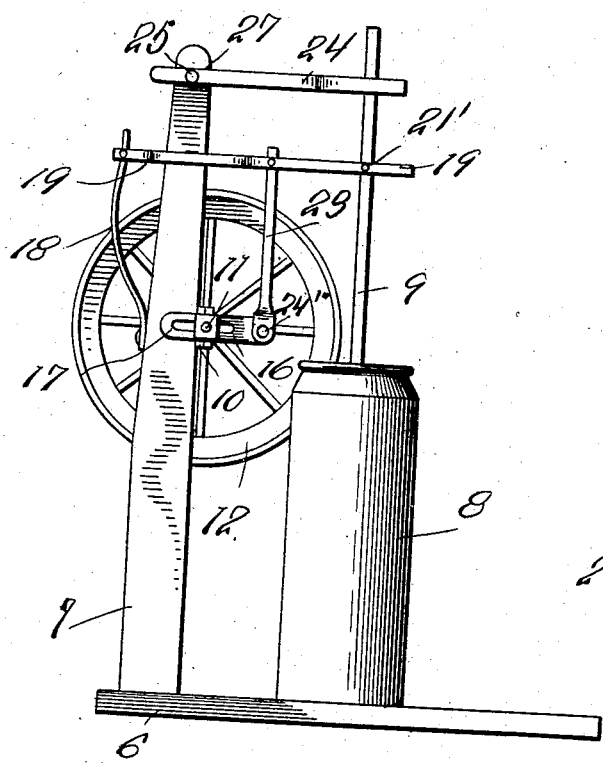
Figure 3:
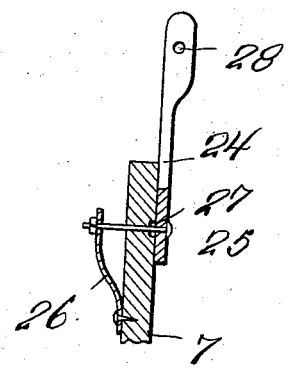
Figure 4:
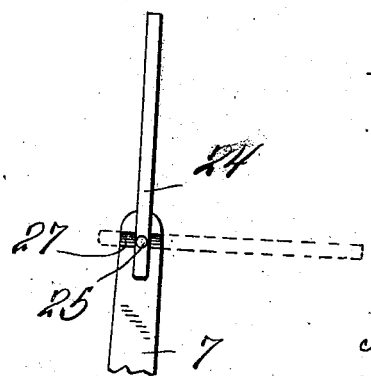
Figure 2:
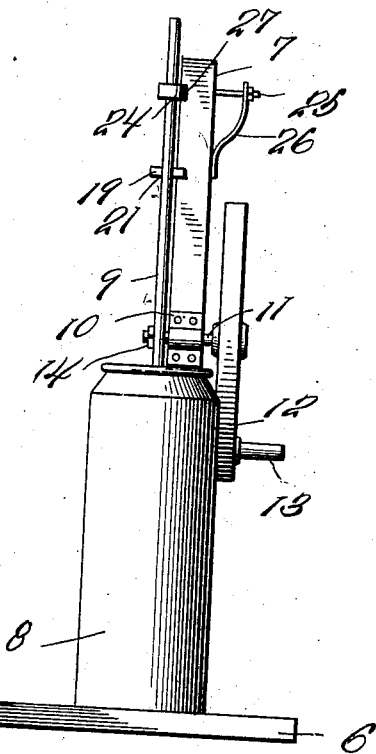
Figure 6:
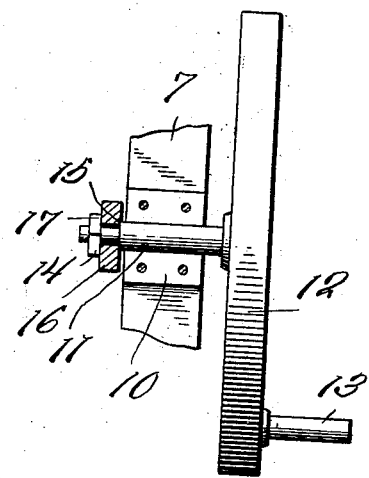
Figure 5:
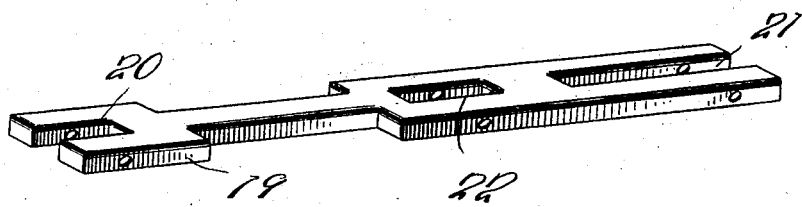

In the accompanying drawings, Figure 1 is a side elevation of the invention. Fig. 2 is a front elevation thereof. Fig. 3 is a detail vertical transverse sectional view through the upper end of the standard for the operating mechanism, showing the manner of mounting the dasher-shaft guide thereon. Fig. 4 is a side elevation thereof in detail, showing the guide swung out of operative position. Fig. 5 is a detail perspective view of the oscillating bar for transmitting the power from the drive-shaft to the dasher-shaft, and Fig. 6 is a detail sectional view of the drive-shaft of the device.

Referring more specifically to the drawings, the numeral 6 denotes a base; 7, an upstanding standard mounted thereon.

The numeral 8 denotes the churn-body, and 9 the dasher-shaft working therein.

Journaled upon the face of the standard adjacent the churn-body 8 in a suitable bearing-bracket 10 is a shaft 11, upon which is mounted a fly-wheel 12, having a crank-handle 13, by means of which the shaft may be rotated. The opposite end of the shaft 11 to the fly-wheel 12 extends beyond the corresponding side of the bracket 10 and is screw-threaded for the engagement therewith of a nut 14 and is shouldered, as at 15. Engaged between the shoulder 15 and the nut 14 is a crank-arm 16, which is slotted, as at 17, for the engagement of the said end of the shaft therethrough, it being understood that by this construction the crank-arm may be adjusted upon the shaft to regulate, in a manner to be presently described, the stroke of the dasher-shaft.

In order to transmit power from the drive-shaft to the dasher-shaft, we provide a novel mechanism, which will now be described. Secured at its lower end to the rear face of the standard 7 and extending upwardly, rearwardly, and laterally therefrom is a spring-metal bracket-arm 18, which, by reason of its lateral extension, has its upper end located in a vertical plane to one side of the standard 7. A bar 19 has its ends bifurcated, as at 20 and 21, and pivotally received in the bifurcation 20 is the upper end of the spring-metal bracket-arm 18, the dasher-shaft 9 being received in the bifurcation 21 of the bar and held therein for movement with this end of the bar by means of a removable pivot-bolt 21'. The bar 19 is slotted, as at 22, intermediate its ends, and engaged through the slot and pivotally connected with the bar at this point is the upper end of a connecting-rod 23, which is connected at its lower end to a stud 24', carried by the crank-arm 17.

It will be readily understood from the foregoing that rotation of the drive-shaft and its crank-arm 17 will result in an oscillation of the bar 14 and a consequent vertical reciprocation of the dasher-shaft 9.

In order that the shaft may be guided during its reciprocatory movement, we provide a guide-bracket 24, which is pivoted upon a bolt 25, which latter extends through the standard 7, adjacent the upper end thereof, and is connected at the opposite side of the said standard to the bracket-arm 24 with the upper end of a spring-arm 26, which tends to movably hold the guide-bracket 24 against the standard regardless of its movement in a vertical plane. To hold the said guide-bracket firmly in a horizontal position to properly guide the dasher-shaft, we form in the adjacent side of the standard a slot 27, into which the rear end of the bracket is adapted to seat, it being understood, of course, that the bracket is provided at a point adjacent its forward end with an opening 28, through which the dasher-shaft extends, and that when it is desired to disconnect the churn and shaft from the operating mechanism it is only necessary to swing the guide-bracket vertically and remove the pin 21', which connects the shaft with the oscillating bar
19. It will furthermore be understood that the bracket-arm 18, being of spring metal, will give sufficiently to permit proper oscillation of the arm 19.

It is to be understood that we do not desire to be limited to the exact details of construction shown and described, for obvious modifications will occur to a person skilled in the art.

What is claimed is—

1. The combination with a dasher-shaft, of a drive-shaft, a crank-arm adjustably connected with the drive-shaft, connections between the crank-arm and dasher-shaft, and a movable guide-bracket for said dasher-shaft.

2. The combination with a dasher-shaft, of a drive-shaft, a crank-arm adjustably connected with the drive-shaft, connections between the crank-arm and dasher-shaft, and a guide-bracket for said dasher-shaft movable into and out of engagement therewith.

3. The combination with a dasher-shaft, of a drive-shaft, a crank-arm adjustably connected with the drive-shaft, connections between the crank-arm and dasher-shaft, a guide-bracket for said dasher-shaft, said bracket being movable into and out of operative position, and means for holding the bracket in operative position.

In testimony whereof we affix our signatures in presence of two witnesses.

JAMES C. GENTRY,
JOHN T. BOTTOMLEE.

Witnesses:
J. L. GODSEY,
WILL ROBESON.